Aug. 20, 1963    H. BINCER    3,100,987
METHOD OF AND APPARATUS FOR ULTRASONICALLY
TESTING BUTT WELDS
Filed Sept. 15, 1959    5 Sheets-Sheet 1

Inventor
Hans Bincer
By *J. Moran*
Attorney

*Inventor*
Hans Bincer

Aug. 20, 1963     H. BINCER     3,100,987
METHOD OF AND APPARATUS FOR ULTRASONICALLY
TESTING BUTT WELDS
Filed Sept. 15, 1959     5 Sheets-Sheet 4

FIG.11.

*Inventor*
Hans Bincer
By *J.P. Moran*
         *Attorney*

United States Patent Office 3,100,987
Patented Aug. 20, 1963

3,100,987
METHOD OF AND APPARATUS FOR ULTRA-
SONICALLY TESTING BUTT WELDS
Hans Bincer, Renfrew, Scotland, assignor to Babcock & Wilcox Limited, London, England, a British company
Filed Sept. 15, 1959, Ser. No. 840,119
Claims priority, application Great Britain Sept. 19, 1958
10 Claims. (Cl. 73—67.7)

This invention relates to an improved method of and improved apparatus for ultrasonically testing butt welds.

In the complete specification of application Serial No. 594,172, now United States Patent 2,953,017, is described apparatus for ultrasonically testing a long butt weld formed between edges of parts of a workpiece having probe means which include a vibration transmitting body with a face for making contact with the workpiece and a probe head in contact with but mounted to oscillate in relation to the body and thereby to sweep an ultrasonic beam from electrode acoustic transducer means on the head to and fro in relation to the depth of the weld. In such apparatus, the use of the probe head increases the length of the path within the probe means through which the ultrasonic vibrations must be transmitted and entails a joint between the body and the head, with the result that the ultrasonic vibrations in passing within the probe means to and from the probe contact face are appreciably attenuated. Whilst such attenuation is permissible when the workpiece is of limited thickness, it creates difficulties when welds of great depth, for example, 3 inches to 6 inches are to be tested, since the shear wave technique on which operation of the apparatus is based implies a substantial reduction in the strength of a signal which may return from a discontinuity in the interior of a weld in a very thick plate. It will be appreciated that there is a limit to amplification of the output signal from the probe means particularly when, as is often the case, there is in progress during the ultrasonic testing electric fusion welding giving rise to electromagnetic interference.

The necessity for an oscillating head with the accompanying joint could be avoided by the use of a plurality of transducers set at different angles appropriate to the testing of different regions in the depth of a weld, but, in practice, only angles of dip in the workpiece within a limited range are useful and, if the paths for ultrasonic vibrations through the body of the probe means are maintained reasonably short, the regions of the contact face towards which the vibrations generated by the transducers are directed are widely separated so that the face must be of large area. It is important, however, that the contact area shall be small in order that gaps, which otherwise are likely to occur between the probe contact face and the surface of the workpiece due to irregularities in the surface, may be avoided. The requisite area of contact face may be reduced by lengthening the paths of the ultrasonic vibrations through the probe body, but this results in increased attenuation of the vibrations within the body. The requisite area of contact face may also be reduced by lessening the size of the transducers and placing their centres closer together, but this again would result in reduced signal strength.

A method of ultrasonically testing a butt weld between parts of a workpiece, according to the present invention, includes locating probe means on the workpiece in suitable position for testing the weld and with a small area of contact between the workpiece and a contact face of the probe means, the contact face permitting rocking of the probe means on the workpiece to vary the location of the area of contact, rocking the probe means on the workpiece and transmitting from different transducers of the probe means towards different areas of the contact face when in vibration transmitting relation to the workpiece ultrasonic vibrations being directed towards different regions in the depth of the weld in order to detect flaws therein.

Advantageously, contact testing ultrasonic vibrations are transmitted through the said contact face towards the different areas when in vibration transmitting relation to the workpiece in order to test the contact between the probe means and the workpiece.

Advantageously, a track is established adjacent to and in the direction of the weld, a carriage for the probe means is moved along the track, the outputs of the probe means during the movement of the carriage along the track are recorded and the record is marked to correlate successive parts of the record with corresponding portions of the weld.

Apparatus for ultrasonically testing a butt weld, according to the present invention, includes a carriage for movement in the direction of the weld, probe means mounted for motion with the carriage but movable on the carriage by biasing means adapted to urge towards the workpiece a contact face of the probe means and by oscillating means adapted to rock the probe means about an axis extending in the direction of movement of the carriage while different areas of the contact face engage the workpiece and a plurality of transducers mounted on the body and adapted to direct ultrasonic vibrations through respective areas of the contact face towards different regions in the depth of the weld.

The invention will now be described, by way of example, with reference to the accompanying diagrammatic drawings in which.

In the vibration transmitting part of FIGURES 1 to 4, there are provide a plurality of transmitter fault finding electro-acoustic transducers 2 and a plurality of contact testing electro-acoustic transducers 3 mounted on a body 1 of material suitable for conducting ultrasonic energy from the transducers, for example material known under the registered trademark "Perspex." The body 1 is formed with a lower, flat, probe contact face 4 and the top of the body 1 is formed adjacent a rear edge thereof with a rearwardly and downwardly inclined flat face 5 for the reception of the transmitter contact testing transducers 3. The rearward and downward inclination of the surface 5 is at an angle A with respect to a plane parallel to the lower flat surface 4 as can most clearly be seen in FIGURES 1 and 4, and the purpose of the inclination is explained below.

Figures 1, 2, 4:
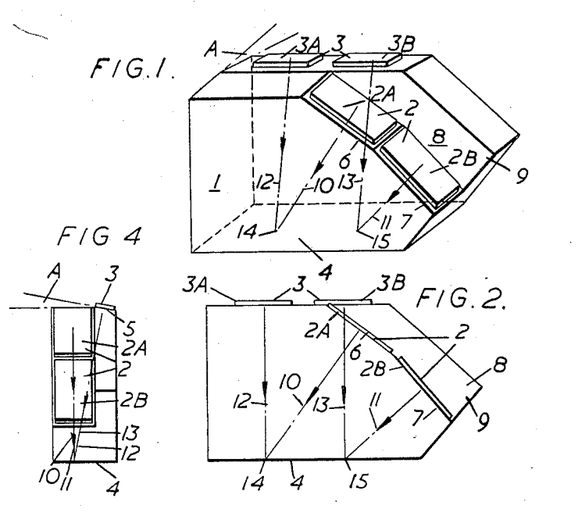
FIGURE 1 is an isometric view of a vibration transmitting part of probe means.
FIGURE 2 is a side elevation of the part of FIGURE 1.
FIGURE 4 is an end view looking from the right of FIGURE 2.
Figure 3:
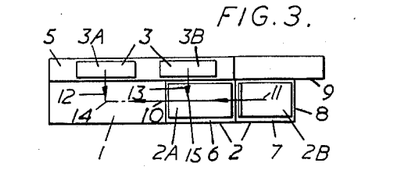
FIGURE 3 is a plan view of FIGURE 2.

The body 1 is formed at the right hand flank thereof as seen in FIGURES 1 to 3 with facets 6 and 7 on which the fault finding transducers 2 are mounted. The facets 6 and 7 extend rearwardly thereof only part of the thickness of the body 1 and comprise the bottom of a rebate 8 formed in the front of the body 1, as seen in FIGURE 2 at an upper, right hand side corner thereof and having an upright rear wall 9 and a base comprising the facets 6 and 7 which define planes intersecting in a line parallel to the base 4 of the body. The facets 6 and 7 are inclined downwardly towards the right hand side as seen in FIGURE 2 with the facet 6 uppermost and the facet 7 inclined downwardly at a steeper angle than the angle of inclination of the facet 6. The purpose of the inclination is explained below.

The fault finding transducers 2 comprise transducers 2A and 2B respectively mounted on the facets 6 and 7 and arranged to propagate ultrasonic energy normally to the facets and into the body 1 towards the base 4 at different inclinations as indicated by the arrows 10 and 11, and the contact testing transducers 3 comprise laterally spaced transducers 3A and 3B mounted on the rearwardly and downwardly inclined flat face 5 and arranged to propagate ultrasonic energy normally to the face 5 and into the body 1 as indicated by the arrows 12 and 13 towards the base 4. The inclination A of the face 5 and the lateral spacing of the transducers 3 is such that the energy propagated from the contact testing transducers 3A and 3B intersects the base 4 at respective regions corresponding to the regions at which the energy propagated from the fault finding transducers 2A and 2B intersect the base 4. Thus the energy propagated from the fault finding transducer 2A which is directed along the arrow 10 intersects the base 4 at a region about a point 14, and the energy propagated from the contact testing transducer 3A which is directed along the arrow 12 intersects the base 4 at a region about the point 14, the arrangement being such that the arrows 10 and 12, which represent hypothetical centre lines of the respective energy propagations, intersect in the base 4 at the point 14. Similarly the energy propagations from the contact testing transducer 3B and the fault finding transducer 2B intersect at a region in the base 4 about the point 15 which represents the intersection of hypothetical centre lines 13 and 11 of the propagated energies.

The inclinations of the facets 6 and 7 are such that the propagated energies from the fault finding transducers 2A and 2B, as indicated by the arrows 10—11, respectively intersect the base 4 at different angles, the angle of the energy associated with the arrow 10, so that in operation, the fault finding transducers inspect a weld being tested at different depths as is explained below.

Figure 5:
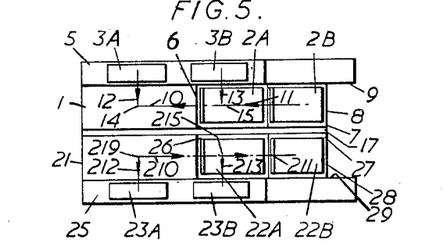
FIGURE 5 is a plan view similar to that of FIGURE 3, but showing the vibration receiving part and the vibration transmitting part of probe means.

In probe means there is provided both a vibration transmitting body and a vibration receiving body and as is shown in FIGURE 5, in which like reference numerals refer to similar parts in FIGURES 1-4, a transmitting body 1 is arranged side by side with a receiving body 21 which is a mirror image of the transmitting body 1 and in which similar parts to those of the transmitting body 1 have similar reference numerals with the added prefix digit 2. Thus the receiving body 21 is provided with contact testing transducers 23A and 23B mounted on an upper face 25 which is inclined forwardly and downwardly away from the body 1 at an angle A, and with fault finding transducers 22A and 22B mounted on respective inclined facets 26 and 27 formed at the base of a rebate 28 having an upright side wall 29. The rebate 28 is arranged at a side of the body 21 adjacent the body 1 and the rebates 8 and 28 together define an open channel between opposite side walls 9 and 29, the base of the channel being defined by the facets 6, 7, 26 and 27.

In order to minimize undesirable interference between the receiver and the transmitter transducers, the bodies 1 and 21 are spaced apart by an intermediate layer 17 of suitable acoustic insulation the bodies 1 and 21 and the layer 17 being secured together as a unit by suitable clamping means.

Figure 6:
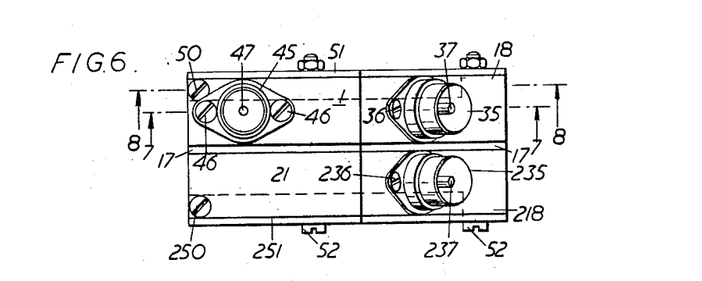
FIGURE 6 is a plan view of the arrangement of FIGURE 5 but with respective cover means for transmitting and receiving transducers.
Figure 7:
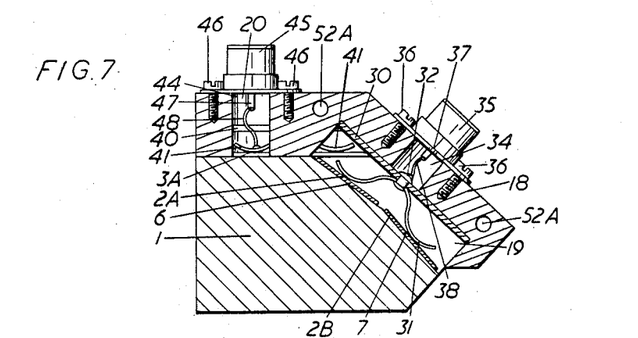
FIGURE 7 is a section on the line 7—7 of FIGURE 6 viewed in the direction of the arrows.
Figure 8:
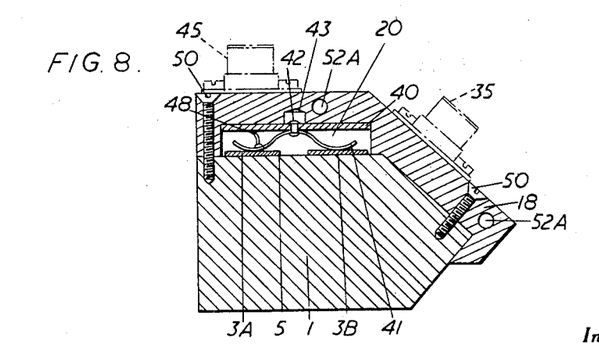
FIGURE 8 is a section on the line 8—8 of FIGURE 6 viewed in the direction of the arrows.

The transmitter and receiver bodies 1 and 21 are provided with respective metal cover plates 18 and 218, as seen in FIGURE 6 to 8, the cover plates 18 and 218 being separated from one another by the layer of acoustic insulation 17.

Each cover plate is formed with two recesses, one above the fault finding transducers and one above the contact testing transducers, then, as seen in FIGURES 7 and 8 the cover plate 18 is provided with recesses 19 and 20 above the fault finding transducers 2A and 2B and the contact testing transducers 3A and 3B respectively. Within each recess is a plate of insulating material associated with spring means for pressing the associated transducers against the surface of the associated part of the body 1. Thus with regard to the cover plate 18 the recess 19 has a plate 30 of insulating material slidable therein and snugly fitting the base of the recess, a spring 31 being fastened adjacent its mid-point to the centre of the plate 30 by rivet 32. The spring 31 is curved in the form of a sine wave having a central peak with troughs either side, the rivet 32 being at the peak and the troughs contacting respective transducers 2A and 2B to urge them against the facets 6 and 7 of the body 1. Outwardly of the recess 19, the cover plate 18 is formed with a bore 34 communicating with the recess and at the outer end of which is positioned a socket 35 for a coaxial cable, the socket being connected to the cover plate 18 by screws 36 and having its central terminal 37 connected to the rivet 32 by a short connector 38 suitably soldered to the rivet 32 and to the terminal 37.

Similarly the recess 20 has a plate 40 of insulating material slidable therein and snugly fitting the base of the recess, a spring 41 being fastened adjacent its mid point to the centre of the plate 40 by a rivet 42, the cover plate 18 being further recessed at 43, behind the rivet 42 to prevent electrical conducting contact between the rivet and the cover plate. The spring 41 is similarly shaped to the spring 31, the rivet connection being at a peak and the troughs on either side contacting respective transducers 3A and 3B to urge them against the body 1 at the inclined upper face 5. The cover plate 18 is formed with an aperture 44 which comprises a frontward extension of the recess 20 as seen in FIGURE 7 and at its upper open end the aperture 44 is provided with a socket 45 for a coaxial cable, the socket being connected to the cover plate 18 by screws 46 and having its central terminal 47 connected to the spring 41 by a short connector 48 suitably soldered to spring 41 and to the terminal 47.

The cover plate 218 of the reeciver body is formed similarly to the cover plate 18 in so far as it is formed with respective recesses above the pair of fault finding transducers 22A and 22B and the pair of contact testing transducers 23A and 23B and the recesses are provided with respective plates of insulating material slidably fitting the recesses, the plates of insulating material being provided with respective springs riveted at their mid points to the plates, the springs being shaped as described for the springs 31 and 41, and at troughs on opposite sides of the associated rivets urging the associated transducers into contact with the body 21. A bore is formed in the cover plate 218, similarly arranged to the bore 34, communicating with the recess associated with the fault finding transducers 22A and 22B and at its outer end provided with the socket 235 for a coaxial cable, the socket being connected to the cover plate 218 by screws 236 and having its central terminal 237 connected to the associated spring by a short connector suitably soldered to the spring and to the terminal 237. There is not provided an aperture and socket corresponding to the aperture 44 and socket 45 of cover plate 18, but the spring associated with the contact testing transducers 23A and 23B is connected by a suitable short connector to the central terminal 237 of the socket 235, the connector being suitably soldered to the spring and the terminal 237. It will be appreciated that the fault finding transducers 22A and 22B, and the contact testing transducers 23A and 23B of the receiver body 21 are connected in parallel, whereas the fault finding transducers 2A and 2B and the contact testing transducers 3A and 3B of the transmitter body 1 are not interconnected since respective electrical impulses are supplied at different times so that flaw detecting signals can be distinguished from contact testing signals. However, on the receiver body 21 a single socket suffices since all of the received signals, which occur at spaced intervals, can be supplied in parallel to a single outlet lead without interference.

The cover plates 18 and 218 are connected to their respective bodies 1 and 21 by countersunk screws 50 and 250 which pass through suitable apertures in the cover plates into threaded apertures in the bodies, clamping the cover plates in position. The bodies 1 and 21 and the intermediate plate of insulating material are clamped between metal side plates 51 and 251 disposed at opposite sides of the probe means and urged together by bolts 52 passing through respective bores 52A extending through the plates 51 and 251 and through the cover plates 18 and 218 and the intermediate plate 17, the plates 51 and 251 thus being in electrical connection with the casings of the sockets 35, 45 and 235 which are at earth potential.

The arrangement and operation of a contact testing and fault finding probe comprising a vibration transmitting body and a vibration receiving body and respective transmitting contact testing and fault finding and receiving contact testing and fault finding transducers is fully described in application Serial No. 519,474, now United States Patent 2,875,607. In the present arrangement pulses of alternating electric potential of ultrasonic frequency are led to the fault finding transducers 2A and 2B and to the contact testing transducers 3A and 3B of the transmitter body 1 through the respective coaxial cable sockets 35 and 45, the sockets being connected to a suitable pulse generator and synchronizer device incorporating means for providing a predetermined delay between pulses to the contact testing transducers and pulses to the fault finding transducers. The pulse generator and synchronizer device is arranged to control the sweep circuit of a cathode ray tube or oscilloscope so that the pulses generated by the generator and synchronizer device result in corresponding indication on the face of the cathode ray tube at points in the sweep of the cathode spot.

The electrical pulses are converted by the transducers 2A, 2B, 3A and 3B into acoustic pulses of ultrasonic frequency which travel through the vibration transmitting body 1 as indicated by respective arrows 13, 11, 12 and 10 towards the face thereof.

Figure 9:
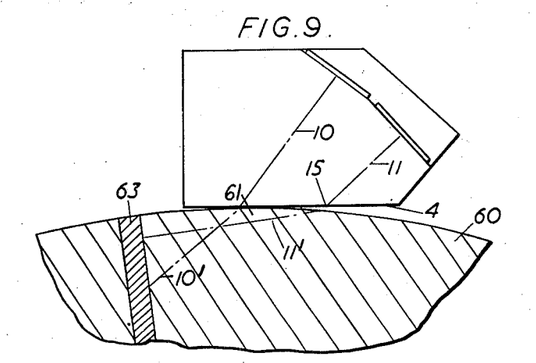
FIGURE 9 is a side view of part of probe means according to the present invention disposed in operative position adjacent a curved surface of an article to be examined.

Referring now to FIGURE 9, the probe means is shown mounted on the curved outer surface of a test object 60 which it is desired to inspect, the probe means being arranged to rock about the instantaneous centre of curvature so that different areas of the base 4 of the probe means come into contact with the surface of the test object 60. It will be appreciated that, as the probe means is rocked, the area of contact traverses across the base 4. In the position shown, the area of contact 61 is around the point 14, described in connection with FIGURES 1 to 4, where the energy transmitted from the fault finding transducer 2A and the energy transmitted from the contact testing transducer 3A intersect the base 4.

Thus, in this position the energy from the transducers 3A and 2A is transmitted through the contact area 61 between the probe means and the test object 60, the energy from the contact testing transducer 3A passing as indicated by arrow 12' in FIGURE 9 downwardly through the wall of the test object substantially normally to the peripheral surface of the test object 60 in the plane of the drawing and at an angle downwardly outwards from the paper. The energy pulses from the contact testing transducer are reflected from the inner peripheral surface of the test object 60 back to the receiving contact testing transducer 23A where they cause an electrical signal which is fed through the coaxial connector socket 235 to a suitable amplifier, not shown, and hence to the cathode ray tube to cause an indication in the form of a blip on the face thereof in the sweep of the cathode spot. The presence or absence of that blip is an indication of whether there is or is not acoustic conducting contact at or around point 14 between the probe means and the wall of the test object.

The energy from the fault finding transducer 2A likewise passes into the wall of the test object but at an angle correlated to the inclination of the transducer 2A by the refractive index, and passes laterally from the contact area 61 towards the zone to be inspected. If the energy impinges on a fault or discontinuity in its path, then some is reflected back to the receiving fault finding transducer 23A where it causes an electrical pulse which is fed from the socket 235 to amplifier means and hence to the cathode ray tube where it causes an indication on the face of the tube at a point in the sweep of the cathode spot. The absence of a reflected pulse, provided that a reflected contact testing pulse is indicated, is an indication of freedom from faults along a line corresponding to the line 10'.

In the position shown in FIGURE 9, the point 15 corresponding to the region of the base 4 at which energy from the contact testing transducer 3B and the fault finding transducer 2B intersect, is not in direct contact with the test object 60, but separated from it by a gap filled with a suitable liquid couplant such as it is commonly used in ultrasonic testing.

A loss of ultrasonic energy will occur in the transition of the energy through the gap, in either direction, whereby the magnitude of the loss depends on the ratio between the instantaneous thickness of the gap and the ultrasonic wave length in the liquid couplant. The position of the probe, as shown in FIGURE 9, therefore, is unfavorable as far as effective scanning where the energy emitted by the transducer 2B is concerned.

When the probe means is rocked about the test object 60, clockwise as seen in FIGURE 9, the area of contact between the probe means and the workpiece moves clockwise, the direct contact around the point 14 is broken, and direct contact is achieved at the point 15 at which position the transducers 2B, 3B, 22B and 23B respectively transmit or receive and operate as described above with reference to the transducers 2A, 3A, 22A, 23A to produce indications on the face of the cathode ray tube.

Since the angle of inclination of the energy from and to the fault finding transducers 2B and 22B is less than the angle of inclination of the energy from and to the fault finding transducers 2A and 22A, the transducers 2B and 22B inspect a region of the tube 60 less deep than the region inspected by the transducers 2A and 22A as indicated by the line 11'.

If the probe means is positioned adjacent a weld 63 as is indicated in FIGURE 9, then the weld in inspected at different depths corresponding to the intersections of the lines 10' and 11' with the weld, whilst maintaining a small area of contact at any instant between the probe and the workpiece. In the above described example, there are shown two sets of fault finding transducers, arranged to inspect at respective depths, but it will be appreciated that more than two sets may be provided if it is desired to inspect at more than two depths, there being provided a similar number of sets of contact testing transducers.

It will be appreciated that although the energy propagations from the transducers are represented by single lines, the energy is propagated in form of a conical beam of substantial cross section. Consequently the weld is inspected not at individual points but over respective regions associated with the fault finding transducers. Suitably the fault finding transducers are so arranged that the respective regions of the weld being tested overlap.

The above described embodiment is suitable for inspecting workpieces having convex outer faces but if it is desired to inspect workpieces having flat or concave outer faces then the lower contact face of the probe may be formed as a convex curve of radius less than that of the surface of the workpiece being inspected so that the above described rocking action may take place.

Figure 10:
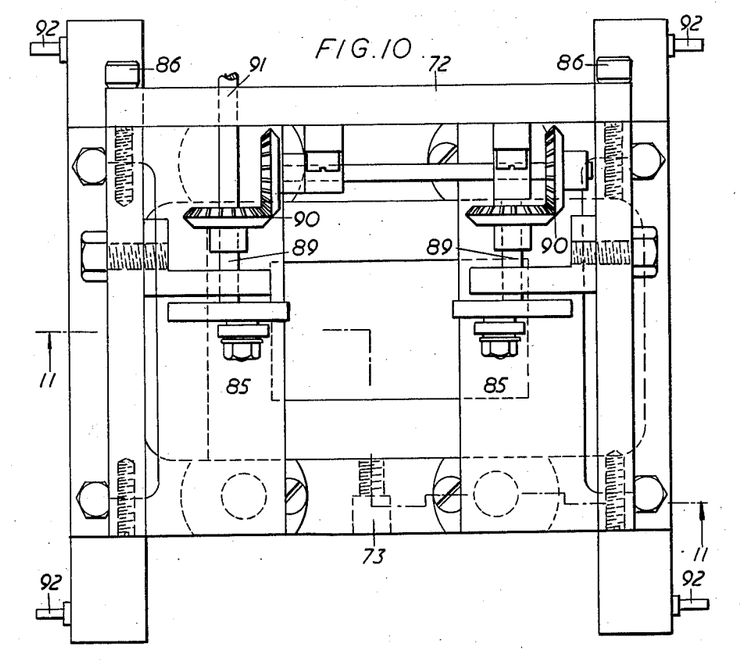
FIGURE 10 is a plan view of part of carriage means suitable for traverse along rails of a track extending parallel to and adjacent a weld to be tested.
Figure 11:
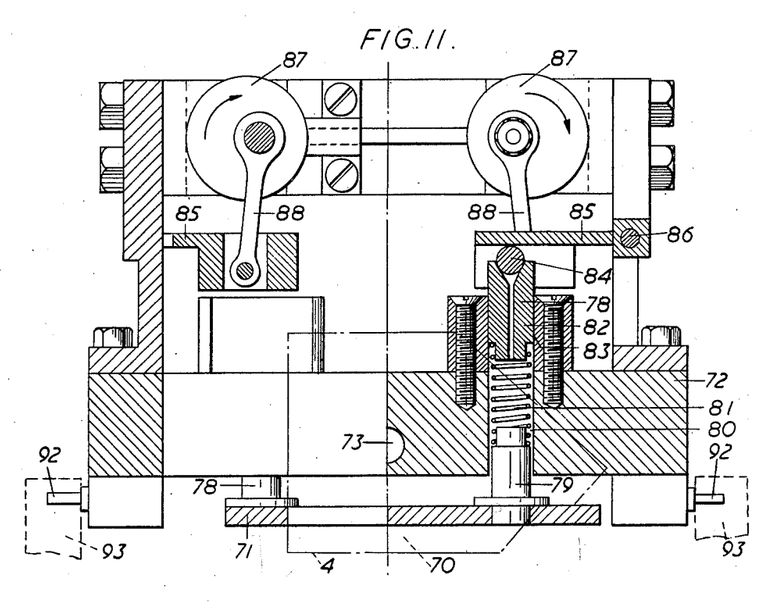
FIGURE 11 is a section taken on the line 11—11 of FIGURE 10 and viewed in the direction of the arrows.
Figure 12:
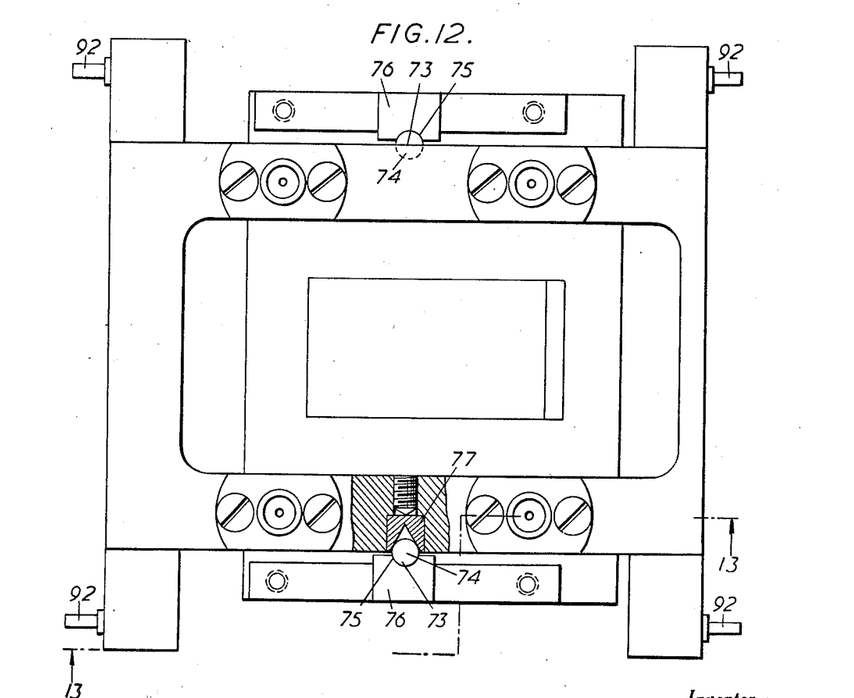
FIGURE 12 is a plan view of the carriage means of FIGURE 10 but with the probe means and an associated carrier removed.
Figure 13:
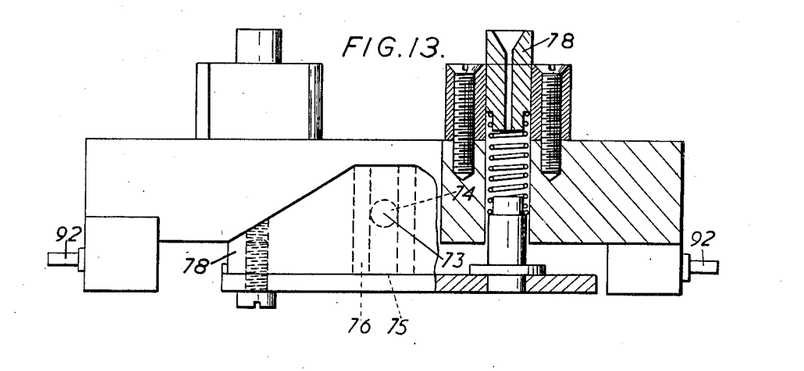
FIGURE 13 is a partly sectional view taken on the line 13—13 of FIGURE 12 and viewed in the direction of the arrows.

Suitably the probe means is mounted on a carrier arranged to be rocked with the desired motion in a carriage which is movable along a track formed adjacent and extending in the direction of the weld of which inspection is desired. A suitable arrangement is shown in FIGURES 10 to 12, in FIGURE 11 of which a probe means arranged and adapted to operate as has been described above is indicated generally at 70 by broken lines. The probe means 70 is mounted in a carrier 71 of framelike form, the body of the probe means projecting through the frame so that the lower contact face 4 thereof is located a suitable distance below the frame 71. The frame of the carrier 71 is mounted on a carriage 72 by means of two captive ball and upright slot connections 73 on opposite sides of the carriage 72, each connection comprising a ball 74 guided in an upright slot 75, the slots 75 being formed in respective upright members 76 of the carrier. The balls 74 lie partly in conical shaped recesses formed in respective seating members 77 which are fitted within recesses at the outer side of forward and rear parts of the carriage 72, one of the recesses having an extension of reduced diameter fitted with a grub screw whereby the distance apart of the balls 74 may be adjusted. The balls 74 constitute pivots between which and the slots 75 relative movement in the direction of the lengths of the slots may occur and the carrier 71 may pivot about an axis passing through the centres of both balls 74. The balls 74 and slots 75 are so positioned that the axis joining the centres of the balls 74 is parallel to the path to be described by the carriage 72.

The carrier 71 is arranged to be rocked about the axis of rotation defined by the balls 74 by means of plungers 78, incorporating resilient biasing means, disposed at opposite sides of the axis and means for oscillating the plungers 78 so that at opposite sides of the axis the plungers move simultaneously in opposite directions. A pair of plungers 78 is provided at each side of the axis of rotation of the carrier 71, the plungers being symmetrically disposed. Each plunger comprising a pillar 79 upstanding from the carrier 71, extending loosely within an upright aperture 80 in the carriage 72 and formed at its upper end with a part of reduced diameter affording a seating for a lower end of an helical compression spring 81, and an upper cylindrical part 81 slidable within a slideway 83 provided on the top of the carriage 72 and having at its lower end a part of reduced diameter affording a seating for the upper end of the helical coil spring 81, and at its upper end a conical recess for the reception of a ball 84.

Respective hinged plates 85 are arranged in engagement with the balls 84 at opposite sides of the axis of rotation of the carrier 71, the plates 85 being hinged at opposite sides of the carriage 72 on hinge bolts 86 passing through apertures in the frame of the carriage into respective threaded recesses in the hinge plates 85. The plates 85 are arranged to be oscillated by individual eccentrics 87 and associated crank rods 88, the eccentrics 87 being mounted on respective shafts 89 which extend parallel to the axis of rotation of the carrier and at opposite sides thereof, the shafts 89 being coupled by means of bevel gearing 90 and driven from a common drive shaft 91. The arrangement of the bevel gearing 90 is such that the eccentrics are driven in the same direction of rotation at the same speed, and the eccentrics are arranged 180° out of phase. As, therefore, the driving shaft 91 is rotated, one of the hinge plates 85 is rotated in a downward direction, and the other in an upward direction with the result that the plungers 78 associated with the first plate 85 urge the adjacent part of the carrier 71 towards the workpiece with increased force, whilst the plungers 78 associated with the other plate 85 effect a reduction in the force urging the adjacent part of the carrier towards the workpiece, it being understood that all of the helical springs 81 are under compression all of the time. Consequently, as the driving shaft 91 is rotated, the contact face 4 of the probe means is continuously urged towards the surface of the workpiece but that the carrier 71, and hence the contact face 4 of the probe means are rocked in relation to the workpiece.

The underside of the carrier 71 may be faced with a suitable gasket of resilient material arranged so that a pool of couplant supplied from a suitable source may be maintained around the probe contact face 4 on the surface of the workpiece to improve ultrasonic conducting contact between the workpiece and the probe means.

The carriage 72 is provided at opposite sides thereof with pairs of cylindrical, laterally extending pins 92 arranged to engage complementary recesses at the inner sides of rails of a suitable track extending parallel to and adjacent the weld to be tested. A suitable arrangement of rails is indicated in broken lines at 93 and suitably the carriage 72 is driven along the track by means of an endless chain connected to the carriage and extending between driver and idler pulleys, the driver pulley being rotatable by an electric motor. A suitable arrangement of track and carriage driving mechanism is described in connection with FIGURE 1 of application Serial No. 594,-172, now United States Patent 2,953,017. The shaft 91 for driving the eccentrics 87 and causing the probe means to rock may be driven by a separate electric motor. Advantageously, the carriage 72 supports an electric switch having a spring-biased operating lever an end of which is adapted to co-operate with equidistantly spaced complementary actuating means on a trackrail, the switch being arranged, on operation, to make an indication on the cathode ray tube to show the location along the weld to which the test results relate.

The apparatus described above enables different regions in the depth of a weld to be proved during a single test and, at the same time, contact of the probe body and the workpiece over a small area is ensured and attenuation of the ultrasonic signals within the probe itself is minimized. Welds of great depth may, therefore, be tested in a satisfactory manner.

What is claimed is:

1. An apparatus for ultrasonically testing a butt weld comprising a carriage adapted to move in a direction parallel to the weld being tested, a probe means mounted on said carriage, said probe means having a contact face with a different radius of curvature than the workpiece containing said weld, means for urging the contact face of said probe means into contact with the workpiece, means for rocking the entire probe means about said workpiece in a direction transverse to the movement of said carriage for varying the location of the contact area between said contact face and said workpiece, and transducers mounted on said probe means for directing ultrasonic vibrations through the respective area of contact toward different regions in the depth of the weld.

2. A device for ultrasonically testing a butt weld comprising a probe head which includes a vibration transmitting body having a contact face surface and an oppositely disposed top surface, said top surface being disposed at an angle to the plane of said face surface, a plurality of contact testing transducers disposed on said top surface, each of said contact transducers being arranged thereon to propagate ultrasonic energy normal to said top surface, said body at one end being formed with a rebate, said rebate having a base defined by a plurality of angularly disposed facets, a fault finding transducer disposed on each of said facets and arranged thereon to propagate ultrasonic energy normal to their respective facets, said facets being disposed so that the inclination of the respective energies propagated by the fault finding transducers thereon vary with respect to one another for inspecting the weld at different depths, the ultrasonic energy transmitted from each contact testing transducer intersecting with the ultrasonic energy transmitted from a corresponding fault finding transducer on the said contact face, said probe head including a vibration receiving body connected to said transmitting body, said receiving body construction forming a mirror image of said transmitting body.

3. A method of ultrasonically testing a butt weld in a workpiece using a probe including a transmitting and receiving body, each body having a plurality of fault finding and contact testing transducers and a workpiece contacting surface thereon, said surfaces having equal radii of curvature which are different than the radius of curvature of the workpiece, said bodies being mutually arranged for cooperatively transmitting and receiving ultrasonic vibrations to and from the workpiece, said method comprising the steps of engaging said surfaces with the workpiece at a location adjacent the weld to be inspected, supplying a coupling fluid between said surfaces and the workpiece to effect positive contact therebetween, moving the probe longitudinally of the weld, simultaneously and continuously rocking said surfaces on said workpiece without sliding to effect a change in the location of the area of contact between said surfaces and the workpiece at a predetermined rate in a direction transverse of the longitudinal movement of the probe, transmitting ultrasonic vibrations from the several fault finding transducers through different areas of surface of said transmitting body toward different regions in the depth of the weld, each region in the depth of the weld corresponding to a particular location of the area of contact between said surface of said transmitting body and the workpiece, and receiving reflected portions of the ultrasonic vibrations in fault finding transducers of the receiving body from said different regions in the depth of the weld to detect the presence of flaws therein.

4. The method as defined in claim 3 including the steps of transmitting ultrasonic vibrations from the several contact testing transducers of said transmitting body to said different areas of the workpiece contacting surface of said transmitting body, and receiving reflected portions of said last named vibrations in the contact transducers of said receiving body to determine the existence of acoustic conducting contact between said surfaces and the workpiece.

5. A device for ultrasonically testing a butt weld in a workpiece comprising a probe head which includes a vibration transmitting body, a vibration receiving body secured to said transmitting body, means for acoustically insulating one body from the other, each of said bodies having a workpiece contacting face surface and an oppositely disposed top surface, said top surface of each of said bodies being disposed at an angle to the plane of its respective contact surface, a plurality of contact testing transducers disposed on each of said top surfaces, each of said bodies at one end thereof being formed with a rebate, the rebate of each body having a base defined by a plurality of mutually angularly disposed facets, and a fault finding transducer disposed on each of said facets, said fault finding transducers being arranged to direct and receive ultrasonic vibrations through various areas of the workpiece surface, said contact testing transducers being arranged to direct and receive ultrasonic vibrations to and from the same said areas of the workpiece surface to test the contact between said workpiece contacting face surface and said workpiece.

6. An apparatus for ultrasonically testing a butt weld comprising a carriage adapted to move in a direction parallel to the weld being tested, a carrier mounted on said carriage for movement therewith, means for pivotally mounting said carrier to said carriage whereby said carrier is free to oscillate about its pivotal axis relative to said carriage, a probe means mounted on said carrier to oscillate therewith, said probe means having a contact face arranged to effect substantially line contact between said contact face and the workpiece, said line contact being transverse to the direction of oscillation of said carrier, means for urging the contact face of said probe means into contact with the workpiece containing said weld, means for oscillating said entire probe means and carrier about said workpiece in a direction transverse to the movement of said carriage for varying the location of the contact area between said contact face and said workpiece, and transducers mounted on said probe means for directing ultrasonic vibrations through the respective area of contact toward different regions in the depth of the weld.

7. The invention as defined in claim 6 wherein said carrier includes plunger means symmetrically positioned on opposite sides of the axis about which said carrier oscillates, said carriage having apertures for accommodating said plunger means, and said oscillating means including means for engaging said plunger means for simultaneously moving the plunger means disposed on either side of said axis in opposite direction in a reciprocation motion.

8. The invention as defined in claim 6 wherein said means for pivotally mounting said carrier includes upright members connected to each side of the carrier, said members being slotted, seating members complementary to said upright members connected to said carriage, and a ball disposed between the respective complementary upright and seating members of the carrier and carriage respectively about which said carrier is adapted to pivot with respect to said carriage.

9. An apparatus for ultrasonically testing a butt weld comprising a carriage arranged to move in a direction parallel to the weld being tested, a carrier mounted on said carriage for movement therewith, means for pivotally mounting said carrier on said carriage whereby said carrier is free to oscillate about its pivotal axis relative to said carriage, a probe means mounted on said carrier to oscillate therewith, said probe means including a transmitting body and a receiving body acoustically insulated one from the other, each of said transmitter body and receiver body being provided with a contact face arranged to effect substantially line contact between said contact face and the workpiece and an oppositely disposed top surface angularly disposed relative to its respective contact face, said line contact being transverse to the direction of oscillation of said carrier, a plurality of contact testing transmitting electro-acoustic transducers and a plurality of contact testing receiving electro-acoustic transducers disposed on the respective top surfaces of said transmitter and receiver bodies, each of said bodies being formed with a rebate defined by a plurality of mutually angularly disposed facets, and a fault finding transmitting transducer and a cooperating fault finding receiving transducer disposed on each of the facets of said transmitting body and receiving body respectively whereby the contact testing transmitting electro-acoustic transducers are respectively adapted to direct ultrasonic vibration toward the same areas of the contact face as the fault finding transmitting transducers, said fault finding transmitting transducers being directed toward different regions in the depth of said welds to detect flaws therein.

10. An apparatus for ultrasonically testing a butt weld comprising a carriage arranged to move in the direction parallel to the weld being tested, a carrier mounted on said carriage for movement therewith, means for pivotally mounting said carrier to said carriage whereby said carrier is free to oscillate about its pivotal axis relative to said carriage, a probe means having a contact face mounted on said carrier to oscillate therewith, means for urging the contact face of said probe means into contact with the workpiece containing said weld, said contact face being arranged to effect substantially line contact between said contact face and the workpiece, said line contact being transverse to the direction of oscillation of said carrier, means for oscillating said probe means carrier about said workpiece in a direction transverse to the movement of said carriage for varying the location of the contact area between the contact face of said probe means and the workpiece, and said probe means including a transmitter body and a receiver body acoustically insulated one from the other, and said transmitter body being provided with a plurality of fault finding transmitting electro-acoustic transducers directed toward different regions in the depth of said weld to detect flaws therein and also with corresponding contact testing transmitting electro-acoustic transducers adapted respectively to direct ultrasonic vibrations toward the same areas of the contact face as the fault finding transmitting transducers, and said receiver body as being provided with fault finding receiving electro-acoustic transducers and contact testing receiving electro-acoustic transmitters respectively complementary to and in receiving relation to said fault finding transmitting electro-acoustic transducers and said contact testing transmitting electro-acoustic transducers.

References Cited in the file of this patent

UNITED STATES PATENTS

| | | |
|---|---|---|
| 2,846,875 | Grabendorfer | Aug. 12, 1958 |
| 2,875,607 | Boxcer et al. | Mar. 3, 1959 |
| 2,953,017 | Bincer et al. | Sept. 20, 1960 |

FOREIGN PATENTS

| | | |
|---|---|---|
| 213,796 | Australia | Mar. 6, 1958 |